US010035413B2

(12) United States Patent
Wolverton et al.

(10) Patent No.: US 10,035,413 B2
(45) Date of Patent: Jul. 31, 2018

(54) HYBRID DRIVE SYSTEM FOR A MOTOR VEHICLE, AND METHOD OF OPERATING A MOTOR VEHICLE

(71) Applicants: Del Wolverton, Santa Rosa, CA (US); Derek Wayne Bailey, Conshohocken, PA (US)

(72) Inventors: Del Wolverton, Santa Rosa, CA (US); Derek Wayne Bailey, Conshohocken, PA (US)

( * ) Notice: Subject to any disclaimer, the term of this patent is extended or adjusted under 35 U.S.C. 154(b) by 265 days.

(21) Appl. No.: 14/728,752

(22) Filed: Jun. 2, 2015

(65) Prior Publication Data
US 2016/0355081 A1   Dec. 8, 2016

Related U.S. Application Data

(63) Continuation-in-part of application No. 12/983,390, filed on Jan. 3, 2011, now Pat. No. 9,074,527.
(Continued)

(51) Int. Cl.
*F01B 13/00* (2006.01)
*B60K 6/24* (2007.10)
(Continued)

(52) U.S. Cl.
CPC .............. *B60K 6/24* (2013.01); *B60K 6/26* (2013.01); *B60K 6/46* (2013.01); *F01B 3/0079* (2013.01); *F01B 13/045* (2013.01); *F01N 13/10* (2013.01); *F02B 57/08* (2013.01); *F02B 75/18* (2013.01); *F02M 35/024* (2013.01); *F02M 35/10026* (2013.01); *B60Y 2200/92* (2013.01); *B60Y 2304/00* (2013.01); *B60Y 2400/433* (2013.01); *F02B 19/14* (2013.01); *F02B 23/06* (2013.01);
(Continued)

(58) Field of Classification Search
CPC . B60K 6/24; B60K 6/26; F01B 3/0079; F01B 3/0088; F01B 3/0091; H02P 7/32; H02P 7/325
See application file for complete search history.

(56) References Cited

U.S. PATENT DOCUMENTS 744,380 A    11/1903  Meridith
1,101,599 A   6/1914  Weisz
(Continued)

FOREIGN PATENT DOCUMENTS

DE    4224074 A1    1/1994
DE    19743919 A1   4/1999
(Continued)

OTHER PUBLICATIONS

Slover, E. (Dec. 17, 2004). Amplidyne Follow-Up System. Retrieved from http://www.eugeneleeslover.com/USNAVY/CHAPTER-10-D.html.*
(Continued)

*Primary Examiner* — Kevin A Lathers
(74) *Attorney, Agent, or Firm* — Jordan IP Law, LLC; Todd A. Vaughn

(57) ABSTRACT

A hybrid drive system for a motor vehicle, and a method for operating a motor vehicle. The hybrid drive system includes an amplidyne-type generator and a counterpoise engine to provide the power required for charging the storage batteries and providing supplemental drive energy (acceleration) to the motor vehicle.

19 Claims, 15 Drawing Sheets

Related U.S. Application Data

(60) Provisional application No. 61/291,975, filed on Jan. 4, 2010.

(51) Int. Cl.

| | | |
|---|---|---|
| *F01B 13/04* | (2006.01) | |
| *F01B 3/00* | (2006.01) | |
| *F02B 57/08* | (2006.01) | |
| *B60K 6/26* | (2007.10) | |
| *B60K 6/46* | (2007.10) | |
| *F01N 13/10* | (2010.01) | |
| *F02M 35/024* | (2006.01) | |
| *F02M 35/10* | (2006.01) | |
| *F02B 23/06* | (2006.01) | |
| *F02B 23/08* | (2006.01) | |
| *F02B 19/14* | (2006.01) | |
| *F02B 55/10* | (2006.01) | |
| *F02B 75/18* | (2006.01) | |

(52) U.S. Cl.
CPC .............. *F02B 23/08* (2013.01); *F02B 55/10* (2013.01); *F02B 2075/1808* (2013.01); *F02B 2075/1816* (2013.01); *F02B 2275/14* (2013.01); *Y10S 903/905* (2013.01); *Y10S 903/906* (2013.01)

(56) References Cited

U.S. PATENT DOCUMENTS

| | | | | |
|---|---|---|---|---|
| 1,122,972 A | 12/1914 | Maye | | |
| 1,151,568 A | 8/1915 | Conill | | |
| 1,282,429 A | 10/1918 | Jones | | |
| 1,286,985 A | 12/1918 | Freer | | |
| 1,336,846 A | 4/1920 | Lewis | | |
| 2,036,060 A | 3/1936 | Newton | | |
| 2,049,780 A | 8/1936 | Rustemeyer | | |
| 2,189,728 A | 2/1940 | Daniels | | |
| 2,330,528 A * | 9/1943 | Stucke | .................... | F02B 57/08 123/44 R |
| 2,374,959 A | 5/1945 | Ruppe | | |
| 2,395,918 A | 3/1946 | Stucke | | |
| 2,433,933 A | 1/1948 | Stucke | | |
| 2,483,151 A * | 9/1949 | Pringle | .................. | H02K 27/06 310/260 |
| 2,512,909 A | 6/1950 | Beaven | | |
| 2,936,632 A | 5/1960 | Palmer | | |
| 3,168,082 A | 2/1965 | De Villiers | | |
| 3,517,651 A | 6/1970 | Graybill | | |
| 3,599,612 A | 8/1971 | Villella | | |
| 3,605,564 A | 9/1971 | Shoemaker | | |
| 3,857,371 A | 12/1974 | Gibson | | |
| 3,946,706 A | 3/1976 | Pailler | | |
| 4,136,646 A | 1/1979 | Lappa | | |
| 4,354,144 A * | 10/1982 | McCarthy | ................ | B60K 6/46 180/65.245 |
| 4,421,073 A | 12/1983 | Arregui et al. | | |
| 4,503,754 A | 3/1985 | Irwin | | |
| 4,589,328 A | 5/1986 | Irwin | | |
| 4,641,550 A | 2/1987 | Meyman | | |
| 5,365,892 A * | 11/1994 | Kienle | .................. | F01B 13/068 123/44 D |
| 7,938,097 B2 | 5/2011 | Sparling | | |
| 8,327,820 B2 * | 12/2012 | Tradler | .................... | F02B 57/00 123/205 |
| 2011/0023812 A1 | 2/2011 | Inden | | |
| 2011/0036323 A1 | 2/2011 | Flenche | | |
| 2011/0162599 A1 * | 7/2011 | Wolverton | .............. | F02B 57/08 123/55.2 |
| 2012/0097125 A1 | 4/2012 | Doss | | |
| 2013/0019835 A1 | 1/2013 | Flenche | | |

FOREIGN PATENT DOCUMENTS

| | | |
|---|---|---|
| DE | 19912939 A1 | 9/2000 |
| FR | 2707701 A1 | 1/1995 |
| FR | 2750162 A1 | 12/1997 |
| GB | 140537 A | 4/1920 |
| GB | 477577 A | 1/1938 |
| GB | 493591 A | 10/1938 |
| GB | 2304818 A | 3/1997 |
| JP | 60043127 A | 3/1985 |
| WO | 8002584 A1 | 11/1980 |
| WO | 2009127003 A1 | 10/2009 |
| WO | 2012089621 A1 | 7/2012 |

OTHER PUBLICATIONS

Ecomotors, Engine Design, http://ecomotors.com/engine-design, 1 page, site visited Jan. 3, 2011.
OX2, OX2 Engine Revealed, http://ox2engine.com/revealed.html, 2 pages, site visited Jan. 3, 2011.
Non-Final Office Action Received for U.S. Appl. No. 12/983,390, dated Aug. 1, 2013, 27 pages. United States Patent and Trademark Office.
Final Office Action Received for U.S. Appl. No. 12/983,390, dated Nov. 14, 2013, 25 pages. United States Patent and Trademark Office.
Advisory Action Received for U.S. Appl. No. 12/983,390, dated Mar. 24, 2014, 3 pages. United States Patent and Trademark Office.
Non-Final Office Action Received for U.S. Appl. No. 12/983,390, dated Apr. 21, 2014, 21 pages. United States Patent and Trademark Office.
Non-Final Office Action Received for U.S. Appl. No. 12/983,390, dated Sep. 16 2014, 15 pages. United States Patent and Trademark Office.
Notice of Allowance Received for U.S. Appl. No. 12/983,390, dated Mar. 2, 2015, 6 pages. United States Patent and Trademark Office.

* cited by examiner

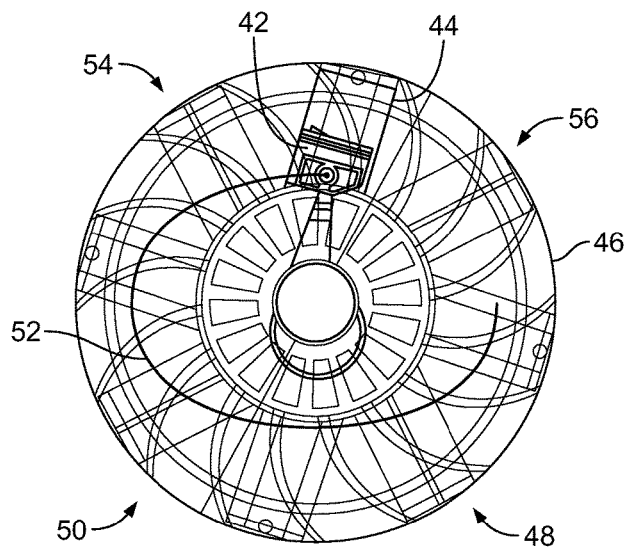
FIG. 2D
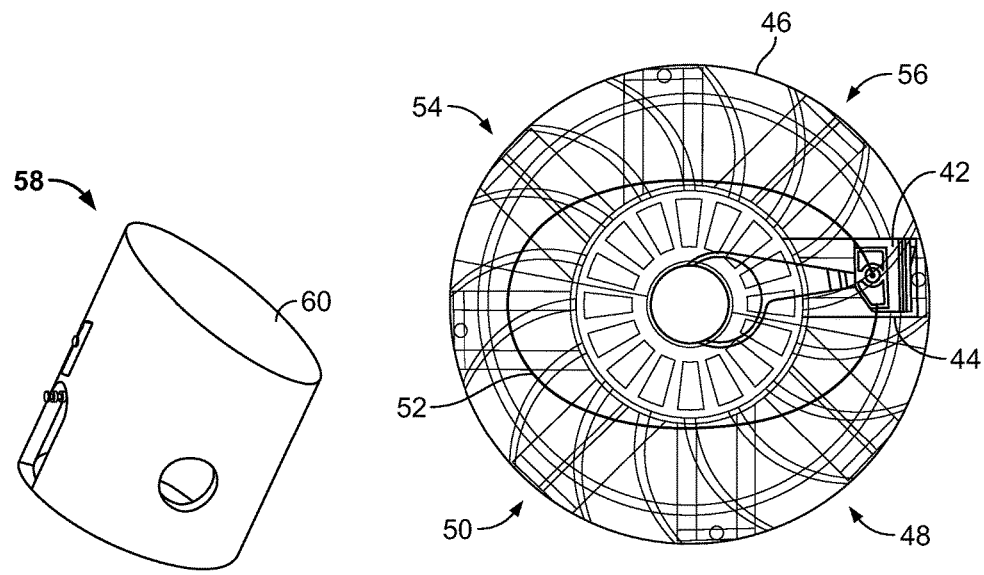
FIG. 3
FIG. 2E

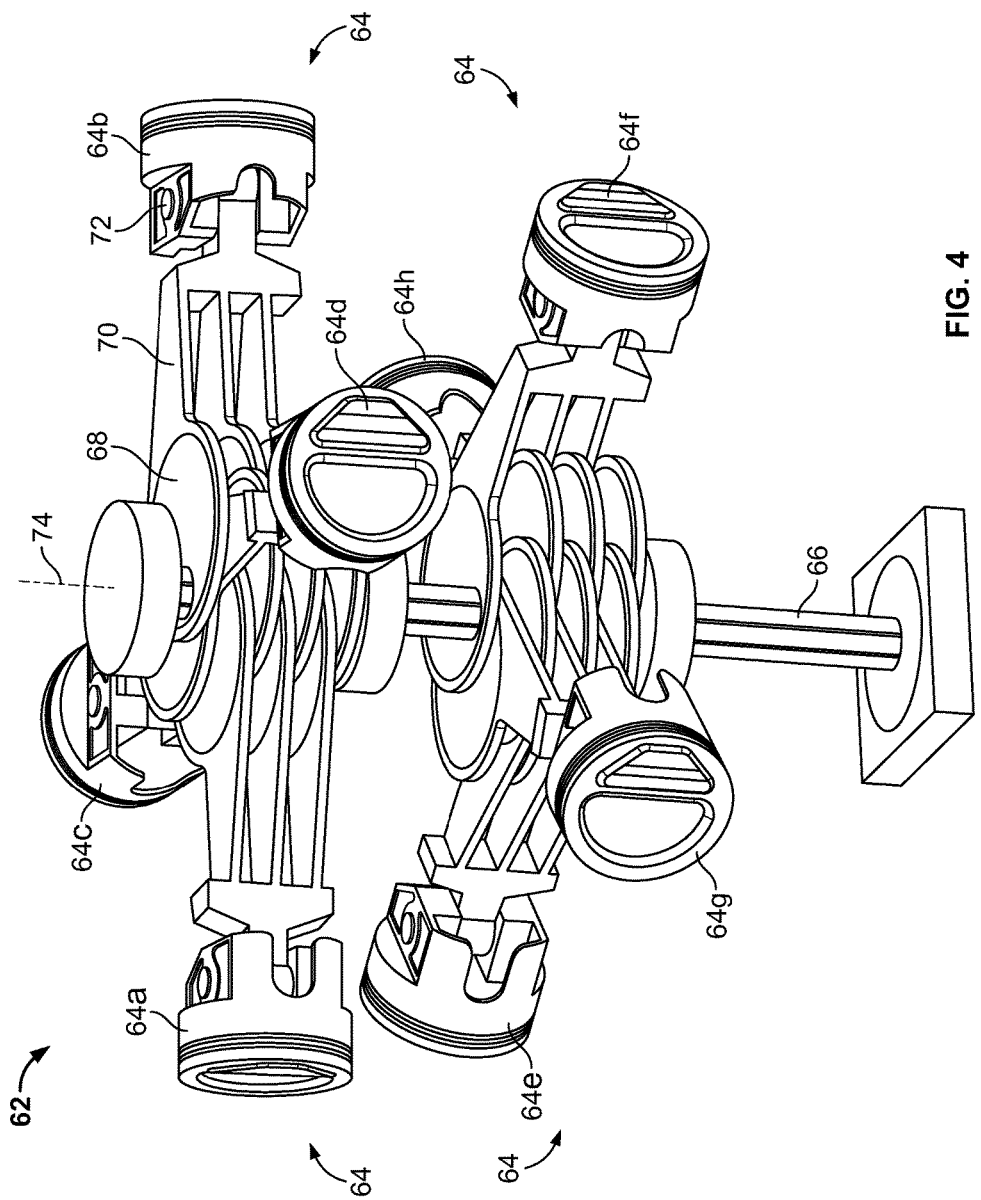

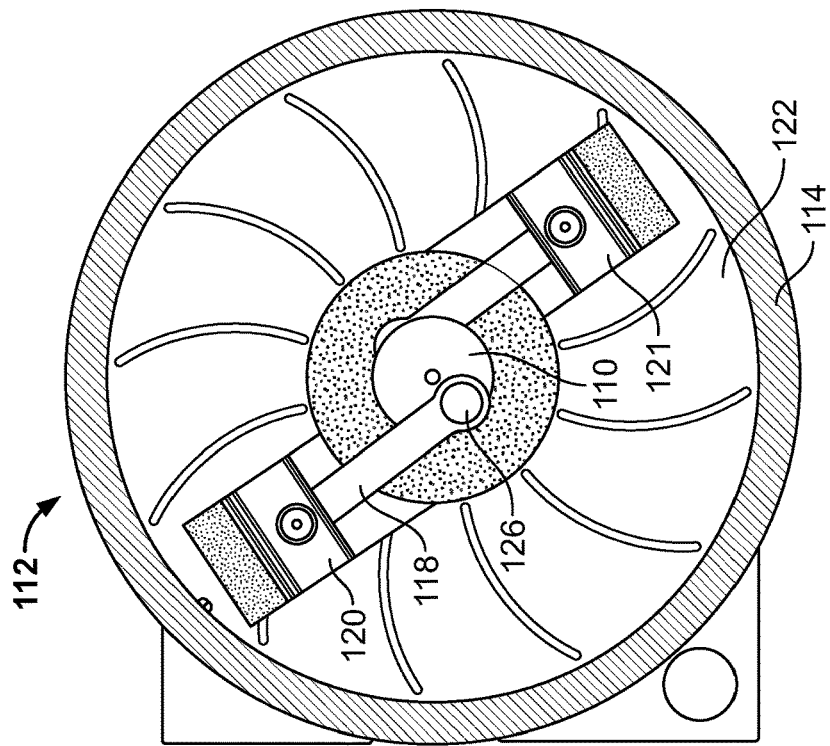
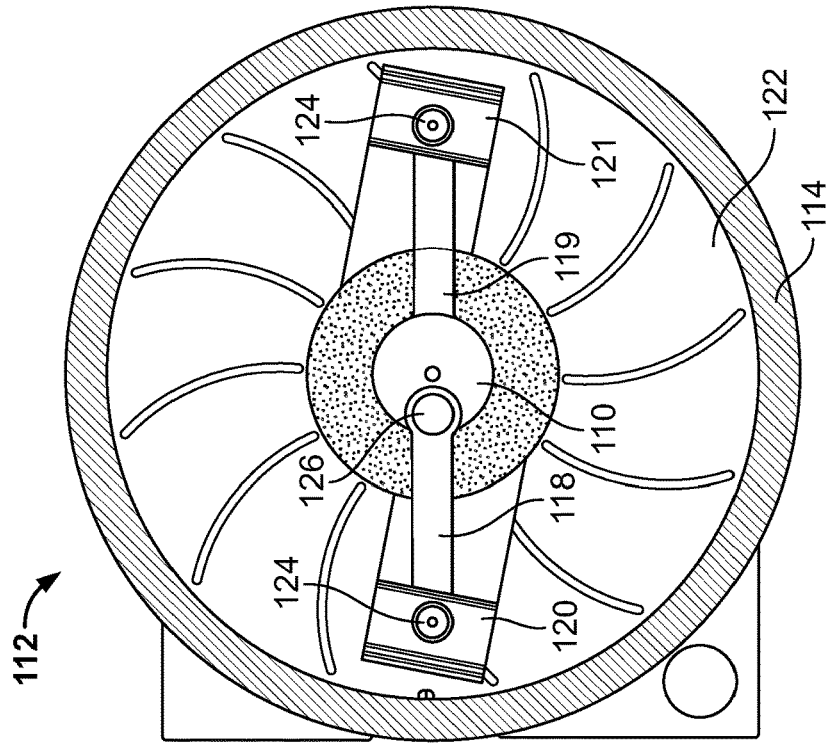

HYBRID DRIVE SYSTEM FOR A MOTOR VEHICLE, AND METHOD OF OPERATING A MOTOR VEHICLE

CROSS-REFERENCE TO RELATED APPLICATIONS

The present application is a continuation-in-part of U.S. patent application Ser. No. 12/983,390, filed Jan. 3, 2011, which claims the benefit of priority to U.S. Provisional Patent Application No. 61/291,975, filed Jan. 4, 2010.

BACKGROUND

Technical Field

Embodiments of the present invention generally relate to engines. More particularly, embodiments relate to a hybrid drive system for a motor vehicle, such a hybrid drive system having a counterpoise engine that uses a rotating bore structure to enhance the efficiency and power of internal combustion engines.

Discussion

In the field of internal combustion engines, various attempts may have been made to cost-effectively increase efficiency and power, while reducing carbon emissions and fuel consumption. A particular conventional engine design is the Otto design, which has four cycles (e.g., intake, compress, ignite and exhaust) and may include the familiar V6 and V8 engines widely used in the automotive industry today. Due to inherent limitations of the Otto engine, however, there remains considerable room for improvement.

For example, while power is conventionally taken from only the ignite cycle, the other three cycles (e.g., intake, compress, and exhaust) are typically preparatory to the power stroke. Accordingly, the conventional engine may be required to rotate through two complete revolutions for each single thrust of power, leading to the need for a flywheel assembly to carry it to the next stroke. Moreover, the conventional approach of pushing pistons up and down in a bore (e.g., combustion chamber) can lead to relatively high amounts of friction.

Other efficiency limiting factors may include the momentum of the piston as it travels up and down in the bore. At high engine rpm (revolutions per minute), the energy required to push each piston up, then stop it and pull it down again may cause stress-related failure in the rod that connects the piston to the engine crankshaft. Additionally, when maximum power is available at the piston, it may be applied to the crankshaft at an angle that is near "top dead center", which can lead to minimal or no rotational energy. In fact, until the crankshaft has rotated forty-five degrees, the power applied to it by the piston may be less than seventy percent of the available foot/pounds of thrust. Therefore, the conventional Otto design may require a minimum of four cylinders, or a cylinder per cycle.

In addition, the valve assembly that allows the fuel-air mixture to enter the combustion chamber and the burned exhaust to exit the chamber can require an excessive amount of energy for the engine to work against the valve springs and cam friction. These additional losses coupled with the aforementioned losses may further limit the efficiency of conventional engine designs.

Conventional hybrid drive systems for motor vehicles operate by converting electric power to motion in the motor, then converting the electric power back to electricity in the generator and, in turn, modulating that electricity to drive electric motors on the wheels, as is the current paradigm for hybrid engines, we will eliminate the power loss at multiple stages. Such a system, however, is inefficient and requires excessive time when charging the battery system.

SUMMARY

Embodiments may include an engine having a crankshaft with a longitudinal axis and a plurality of pistons coupled to the crankshaft. The engine can also include a bore structure with surfaces that define a plurality of combustion chambers, wherein each combustion chamber can contain a piston. The bore structure may rotate about the longitudinal axis of the crankshaft in response to piston displacement within the combustion chambers.

Embodiments may also include a bore structure having surfaces that define a pair of opposing combustion chambers with longitudinal axes that are offset from the center of a longitudinal axis of a crankshaft to be coupled to the bore structure. If displacement of a piston disposed within a combustion chamber and coupled to a crankshaft occurs, the bore structure can rotate about the longitudinal axis of the crankshaft.

Other embodiments can involve a method that initiates a displacement of a pair of opposing pistons within a corresponding pair of opposing combustion chambers. The method may also rotate a bore structure containing the pair of opposing combustion chambers in response to the displacement. In addition, the pair of pistons can be rotated in an oval path in response to rotation of the bore structure.

Embodiments may also include a hybrid drive system for a motor vehicle, and a method for operating a motor vehicle. The hybrid drive system includes an amplidyne generator and the counterpoise engine described herein to provide the power required for charging the storage batteries and providing supplemental drive energy (acceleration) to the motor vehicle.

DRAWINGS

The various advantages of the embodiments of the present invention will become apparent to one skilled in the art by reading the following specification and appended claims, and by referencing the following drawings, in which:

FIGS. 2A-2E are cut away top views of an example of a piston rotating in an oval path in accordance with embodiments;

FIG. 3 is a perspective view of an example of a piston in accordance with embodiments;

FIG. 4 is a perspective view of an example of an eight cylinder piston assembly in accordance with embodiments;

FIGS. 7A-7H are cut away top views of examples of a two cylinder engine having a crankshaft with a substantially round cross section in accordance with embodiments;

DESCRIPTION

Figure 1A:
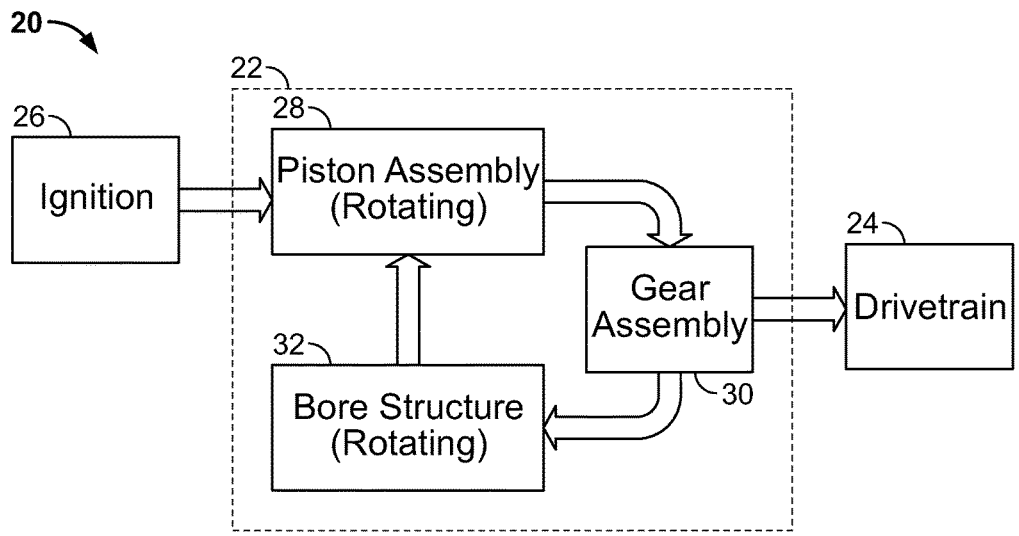
FIG. 1A is a block diagram of an example of a system having a rotating bore structure in accordance with embodiments.

Turning now to FIG. 1A, a system 20 is shown in which an engine 22 provides rotational power to a drivetrain 24 in response to one or more ignition events triggered by an ignition 26. In the illustrated example, ignition of a compressed fuel-air mixture causes rotation of a piston assembly 28, which transfers rotational energy (e.g., via a crankshaft, not shown) to a gear assembly 30. The gear assembly 30 may in turn transfer rotational energy to the drivetrain 24 as well as to a rotating bore (e.g., combustion chamber) assembly/structure 32, which is designed to facilitate the rotational motion of the piston assembly 28. In one example, the engine 22 may be considered a "counterpoise" engine in that it can use counterbalanced and opposing forces to impart rotational motion to both the bore structure 32 and the piston assembly 28. In particular, if the crankshaft rotates clockwise through 360 degrees, the bore structure 32 may rotate counter-clockwise through 360 degrees. Therefore, the virtual rotational angle can be 720 degrees for each single revolution of the crankshaft, and four cycles of the engine 22 can be completed in one complete revolution of the crankshaft. Furthermore, the rotation of the bore structure 32 may replace the need for a flywheel assembly as may typically be required in conventional Otto engines. Other components such as intake and exhaust cycle related components (not shown) may also be included in the system 20, and are described in more detail below.

Figure 1B:
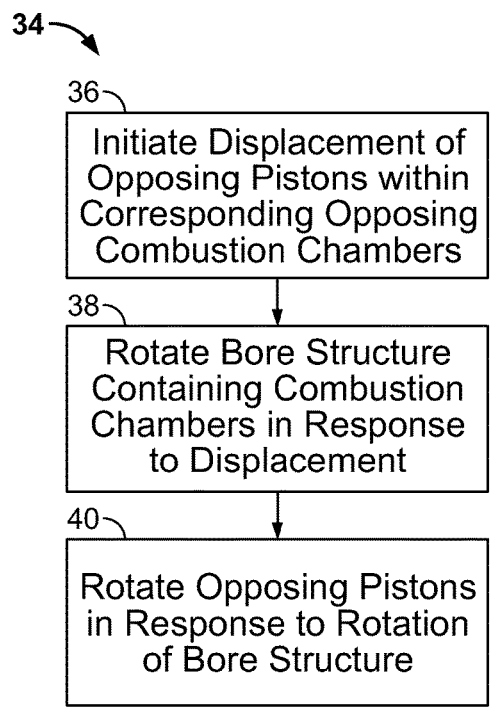
FIG. 1B is a flowchart of an example of a method of operating a system having a rotating bore structure in accordance with embodiments.

FIG. 1B shows a method 34 of operating a system having a rotating bore structure. Processing block 36 provides for initiating a displacement of a pair of opposing pistons that are disposed within a corresponding pair of opposing combustion chambers. As will be discussed in greater detail, the initiation of the displacement could be associated with a combined power-intake cycle for the pair of pistons or a combined exhaust-compression cycle for the pair of pistons. For example, one piston in the pair may be undergoing the power cycle while the other piston in the pair is undergoing the intake cycle in the case of the combined power-intake cycle. Similarly, one piston in the pair may be undergoing the exhaust cycle while the other piston in the pair is undergoing the compression cycle in the combined exhaust-compression cycle. A bore structure containing the combustion chambers may be rotated at block 38 about a longitudinal axis of a crankshaft coupled to the pair of opposing pistons in response to the displacement. Illustrated block 40 provides for rotating the pair of pistons in an oval path about the longitudinal axis in response to the rotation of the bore structure.

Figure 2A:
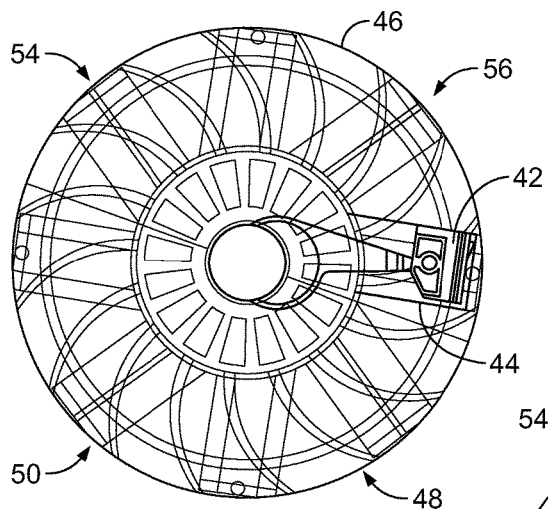
Figure 2B:
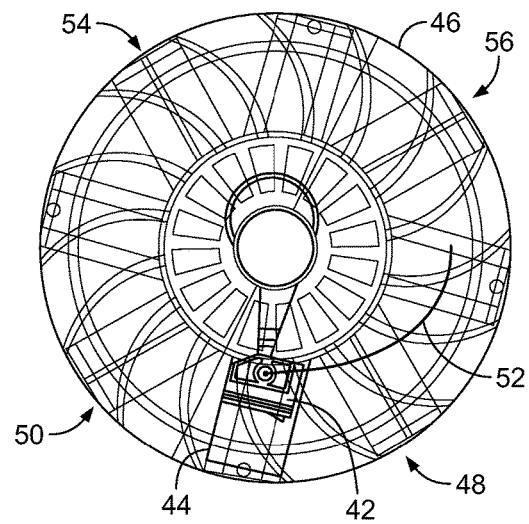
Figure 2C:
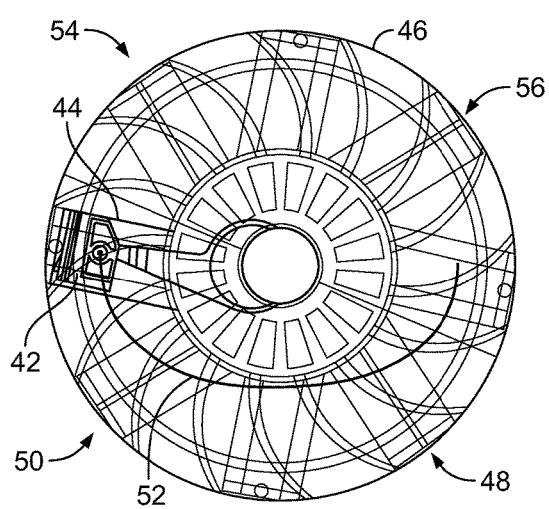

FIGS. 2A-2E show a top view of a piston 42 that is contained within a combustion chamber 44 of a rotating bore structure 46. The rotating bore structure 46 may have functionality similar to that of the bore structure 32 (FIG. 1A), already discussed. In particular, FIG. 2A demonstrates that ignition of a compressed fuel-air mixture in the combustion chamber 44 begins a power cycle in region 48 for the piston 42. FIG. 2B shows that at the end of the power cycle region 48, the combustion chamber 44, bore structure 46 and piston 42 have rotated ninety degrees clockwise. The crankshaft (not shown), however, that couples the piston assembly through the gear assembly 30 (FIG. 1A) and back to the bore structure 46, has rotated ninety degrees counter-clockwise (e.g., equal and opposite rotation). Moreover, the piston 42 has retracted to a minimum extension position for the start of an exhaust cycle associated with region 50 and the piston 42 has begun an oval path 52 of rotation. As shown in FIG. 2C, the illustrated exhaust cycle in region 50 provides for expulsion of the burned gases from the power cycle of region 48 and the start of an intake cycle associated with region 54 when the piston 42 reaches the 180 degree position and full extension.

FIG. 2D demonstrates that the intake cycle may enable the combustion chamber 44 to intake a fuel-air mixture as the piston 42 sweeps through the region 54 and retracts to the minimum extension at the 270 degrees clockwise position. As shown in FIG. 2E, the fuel-air mixture can be compressed in a compression cycle associated with a region 56 as the piston 42 rotates back to the zero degree position and completes the oval path 52. Because the actual path 52 of the piston 42 is not reciprocating, the illustrated approach significantly reduces power loss due to reciprocity and increases efficiency. In addition, by offsetting the longitudinal axis of the combustion chamber 44 from the longitudinal axis of the crankshaft (not shown), the illustrated approach enables greater torque to be achieved. As will be discussed in greater detail, the angle of the offset may be either fixed or variable. Moreover, the piston 42 can be paired with an opposing piston (not shown) to counterbalance the rotational movement of the piston 42 and further enhance efficiency. The counterbalancing aspects of the embodiments are described in greater detail below.

Turning now to FIG. 3, a piston 58 is shown. The piston 58 may readily be substituted for the piston 42 (FIGS. 2A-2E), already discussed. In the illustrated example, the piston 58 has a sloped (e.g., fifteen degrees) piston face 60 that provides an increased surface area and greater torque. For example, in a combustion chamber diameter of four inches, if the surface area of the piston face 60 is thirteen square inches and the perimeter is 12.56 inches, a stroke of one inch would yield thirteen cubic inches of displacement. If the pressure on the piston face 60 is 1000 pounds per square inch, the resultant pressure on the piston (e.g., torque at the top of the combustion chamber) would therefore be 13,000 pounds. By contrast, a non-sloped piston face in a similar configuration would experience less pressure (e.g., 12,560 pounds) on the piston face due at least in part to a smaller surface area.

In addition to the increase in pressure (e.g., 3.5% increase), the slope angle of the piston face 60 may effectively add to the offset angle of the combustion chamber to further increase the amount of usable surface for the combustion chamber rotation. For example, a piston face slope of fifteen degrees might be added to an 11.25 degree offset angle to obtain a usable surface angle of 26.25 degrees. The sine of 11.25 degrees is 0.19, or about twenty percent of the total pressure applied to the combustion chamber rotation. Thus, without sloping the piston face 60, the offset angle of the combustion chamber may provide twenty percent of 13,000 pounds (i.e., 2,600 pounds) of torque at the top of the combustion chamber. The sine of 26.25 degrees, however, is about forty-four percent, which, when multiplied by the new pressure of 13,000, results in 5,720 pounds of torque at the top of the combustion chamber. Accordingly, a significant increase in overall efficiency may be obtained by sloping the piston face 60. Specific values are provided herein only to facilitate discussion and do not limit the embodiments described.

FIG. 4 shows a piston assembly 62 in which four pairs of opposing pistons 64 (64a-64h) provide for eight cylinder operation of a counterpoise engine. The pistons 64 may have a similar functionality and shape of the piston 42 (FIGS. 2A-2E) and/or piston 58 (FIG. 3), already discussed. In particular, each piston 64 can rotate in an oval path about a longitudinal axis 74 of the crankshaft 66, wherein the piston 64 completes four cycles in a single 360 degree rotation. Additionally, each piston 64 may have a sloped face to further increase torque and enhance efficiency. In the illustrated example, opposing pistons 64a and 64b counterbalance one another, opposing pistons 64c and 64d counterbalance one another, opposing pistons 64e and 64f counterbalance one another, and opposing pistons 64g and 64h counterbalance one another. Each piston 64 may be coupled to the crankshaft 66 via one or more inserts 68, a rod 70 and a pin 72, wherein the illustrated crankshaft 66 has a substantially round cross-section, and the inserts 68 have mating apertures and are coupled to the crankshaft 66 at an offset position. Alternatively, the crankshaft 66 may have a substantially square cross-section, wherein the inserts 68 can have mating square-shaped apertures and are coupled to the crankshaft 66 at an offset position. A first end of the rod 70 may be coupled to the inserts 68, and the pin 72 may be coupled to a second end of the rod 70 and the piston 64. Other configurations for the piston assembly may also be used.

Figure 5:
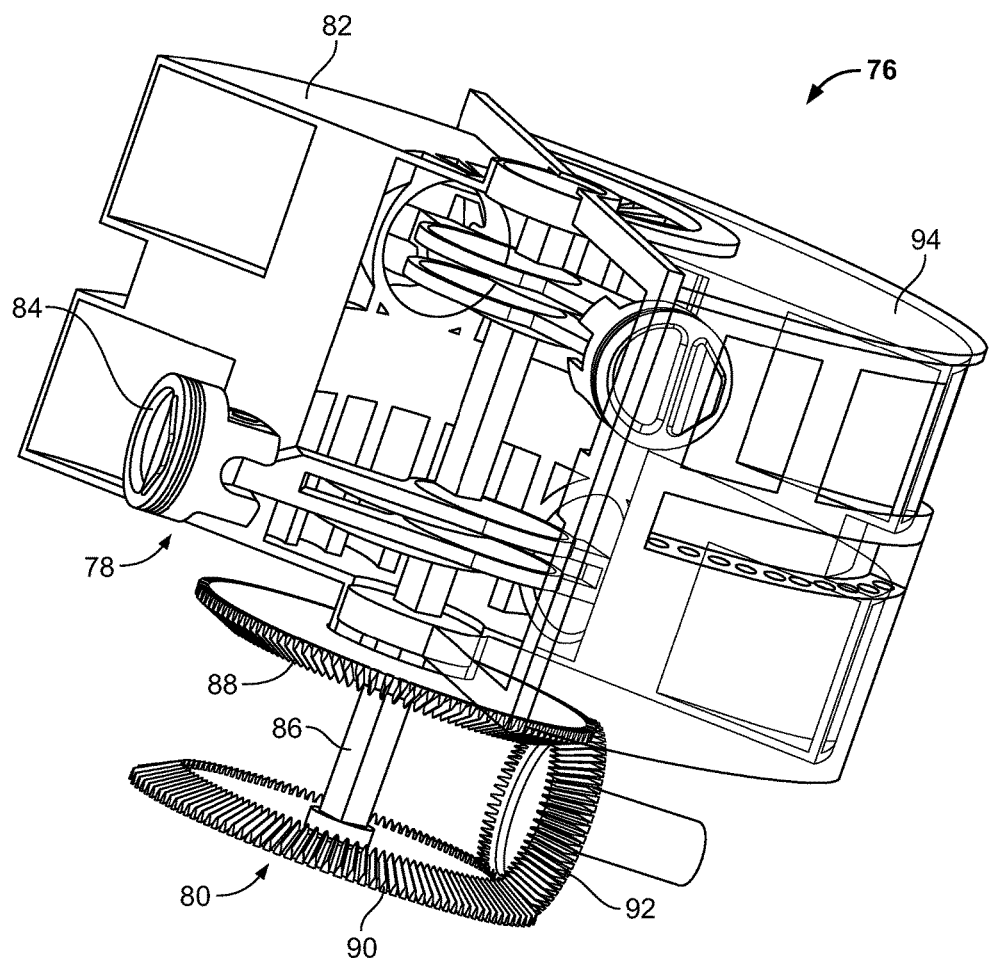
FIG. 5 is a cut away perspective view of an example of a four cylinder piston assembly and gear assembly in accordance with embodiments.

Turning now to FIG. 5, a counterpoise engine 76 is shown in which four cylinder operation is enabled. The illustrated engine 76 includes a rotating piston assembly 78, a gear assembly 80 and a rotating bore structure 82. The engine 76 may be similar to the engine 22 (FIG. 1A), already discussed, and can therefore be used to transfer rotational energy to a drivetrain (not shown) in a uniquely efficient manner. In particular, opposing pistons 84 may be coupled to a crankshaft 86 at an offset position, wherein the illustrated gear assembly 80 includes a bore gear 88 coupled (via a concentric shaft) to the bore structure 82, a crank gear 90 coupled to the crankshaft 86, and a drive gear 92 that mates with the bore gear 88 and the crank gear 90. Rotation of the illustrated bore structure 82 and the pistons 84 about the longitudinal axis of the crankshaft 86 is therefore in an opposite direction of the rotation of the crankshaft 86 itself. The illustrated view also includes an intake/exhaust portion of a housing 94 that encloses the bore structure 82 and the pistons 84, to be described in greater detail below.

Figure 6:
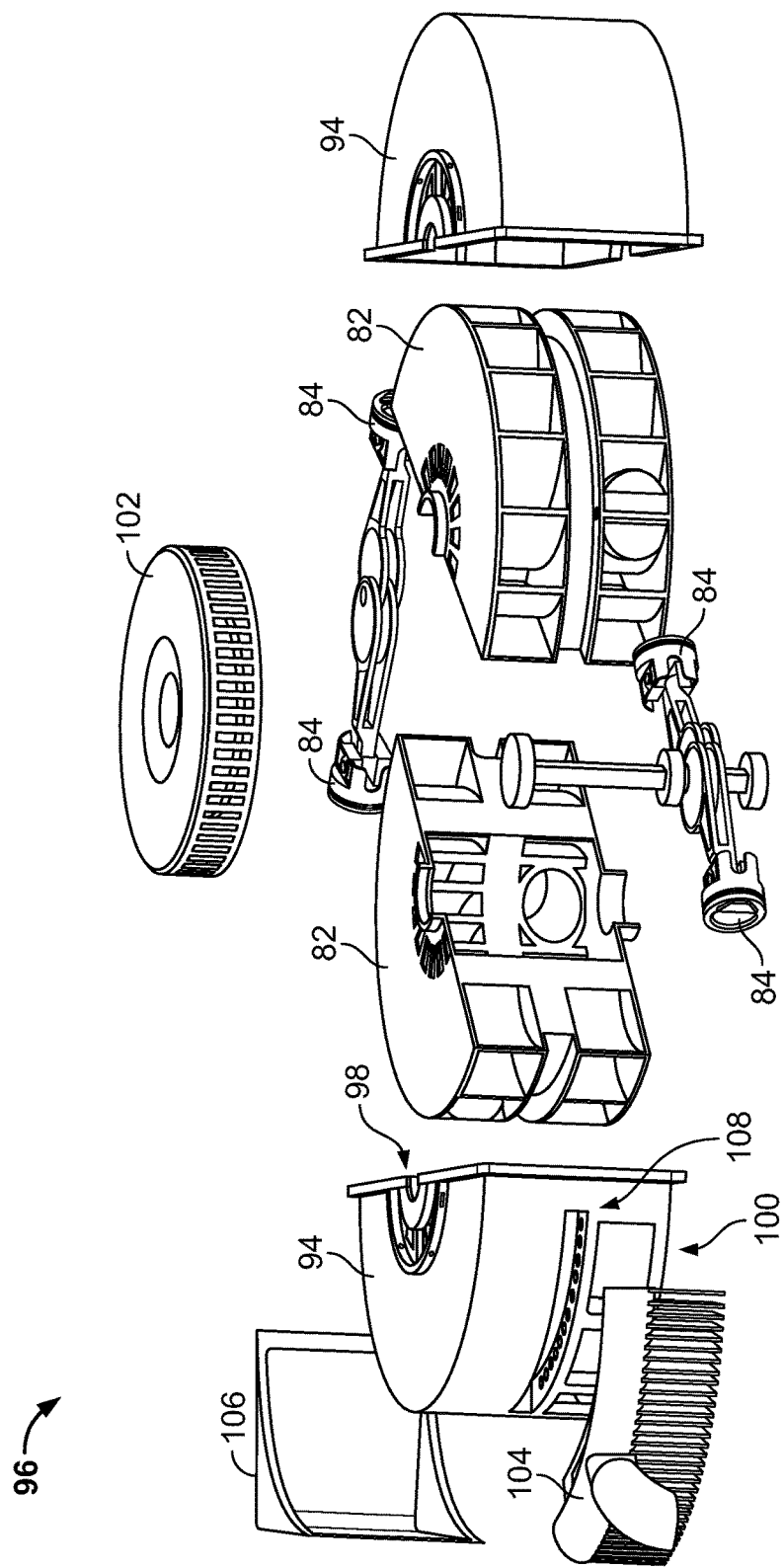
FIG. 6 is an exploded view of an example of a four cylinder engine in accordance with embodiments.

FIG. 6 shows an exploded view of a four cylinder counterpoise engine 96 having a housing 94 that encloses a bore structure 82 and a plurality of pistons 84. The illustrated housing 94 includes surfaces defining a pressurization inlet 98, a pressurization outlet (not shown), a cooling outlet 100, and an intake inlet (not shown) for the bore structure 82. The engine 96 may also include an air filter 102 coupled to the pressurization inlet 98, an exhaust manifold 104 coupled to the cooling outlet 100, and an intake plenum 106 coupled to the pressurization outlet and the intake inlet. The illustrated air filter 102 enables a large volume of air to pass down through the top of the engine housing 94 to the interior of the rotating bore assembly 82, which may also function as a blower. The entering air may then be pressurized for exit from the housing 94 at two locations. The first exit of the pressurized air is through the cooling outlet 100 across the fins of the exhaust manifold 104, which cools the air prior to exit to ambient air. The second exit of the pressurized air is through the pressurization outlet into the intake plenum 106, where it remains under pressure to be acquired by the intake cycle of the engine 96.

The illustrated exhaust manifold 104 is a curved tube that inserts into a mid-belt region 108 of the housing 94 from the outside. The exhaust manifold 104 may collect the expelled gases during the exhaust cycle of the pistons through ports in the mid-belt region 108, and direct the expelled gases to an exhaust pipe and muffler system (not shown). As already noted, welded to the illustrated exhaust manifold 104 are cooling fins that protrude down in front of the cooling outlet 100. As also already noted, the intake plenum 106 may capture pressurized air from the top portion of the bore structure 82 and maintain the pressure at intake ports to the pistons 84 for use during the intake cycle. The porting of input and output gases can be accomplished via well documented slip valve technology or other technology having relatively low friction and spring losses.

Figure 7C:
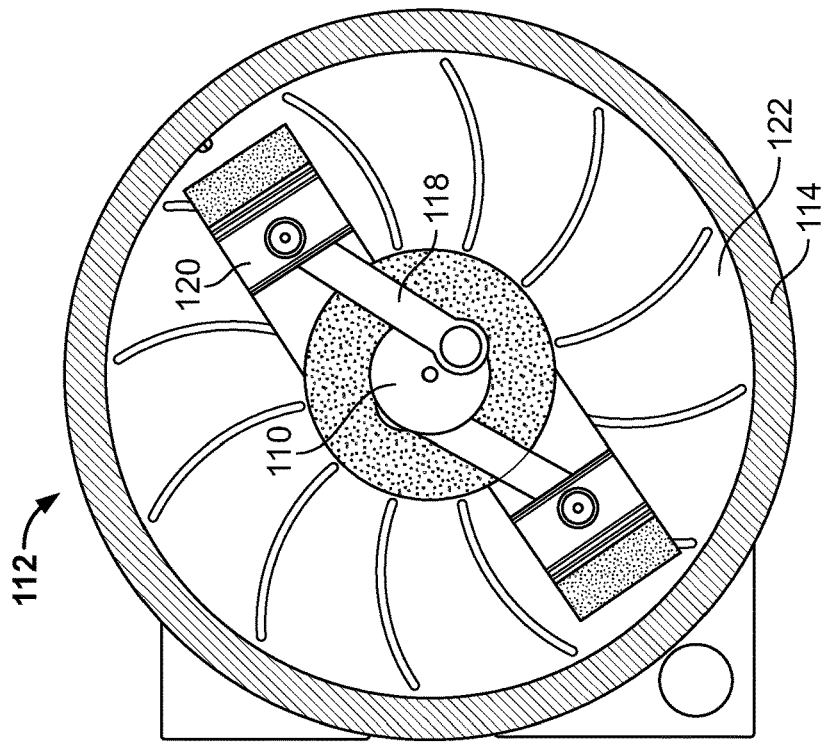
Figure 7D:
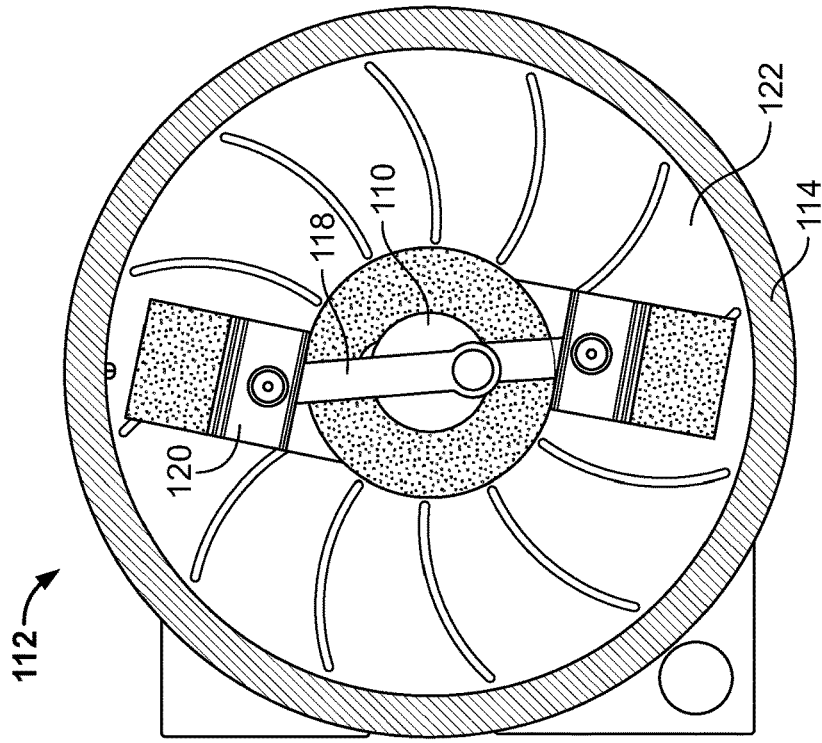
Figure 7E:
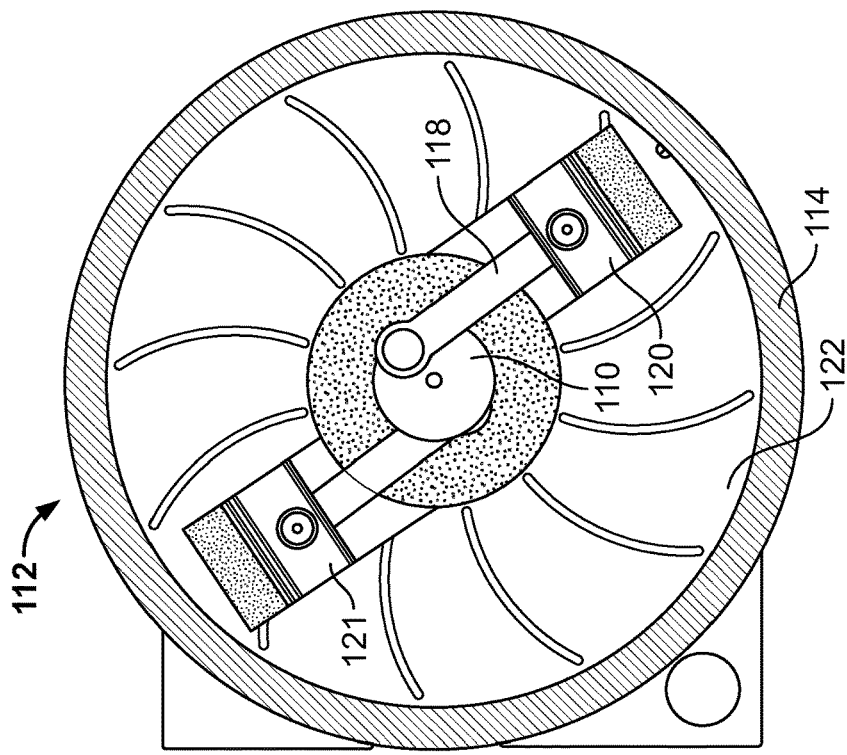
Figure 7F:
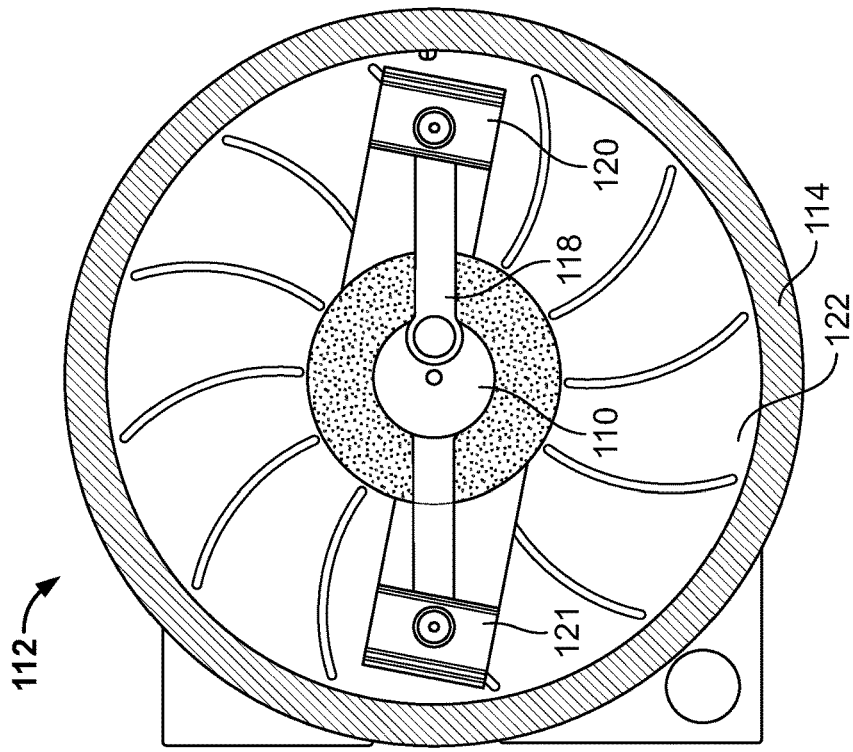
Figure 7H:
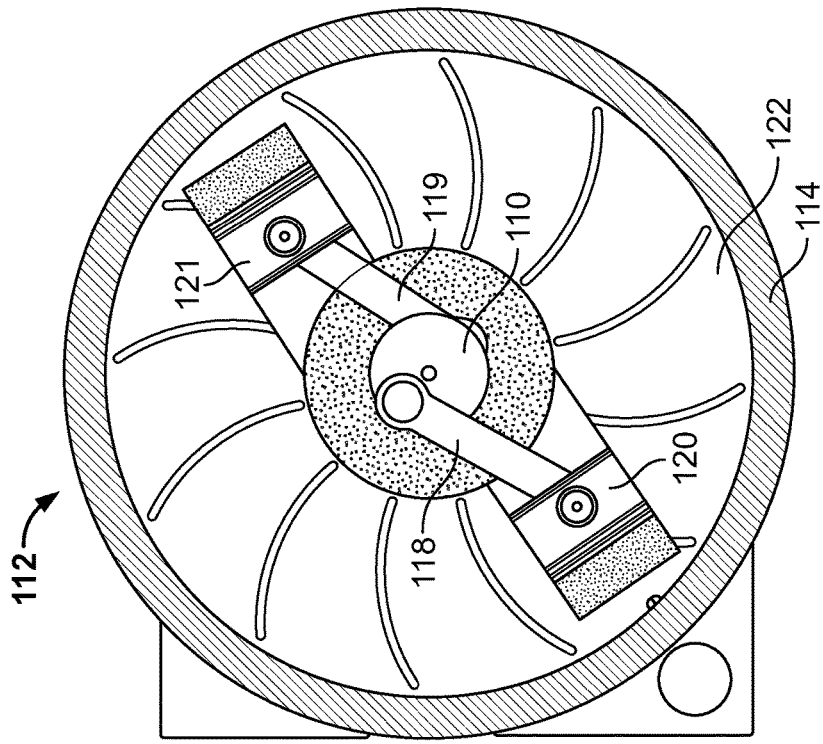
Figure 7G:
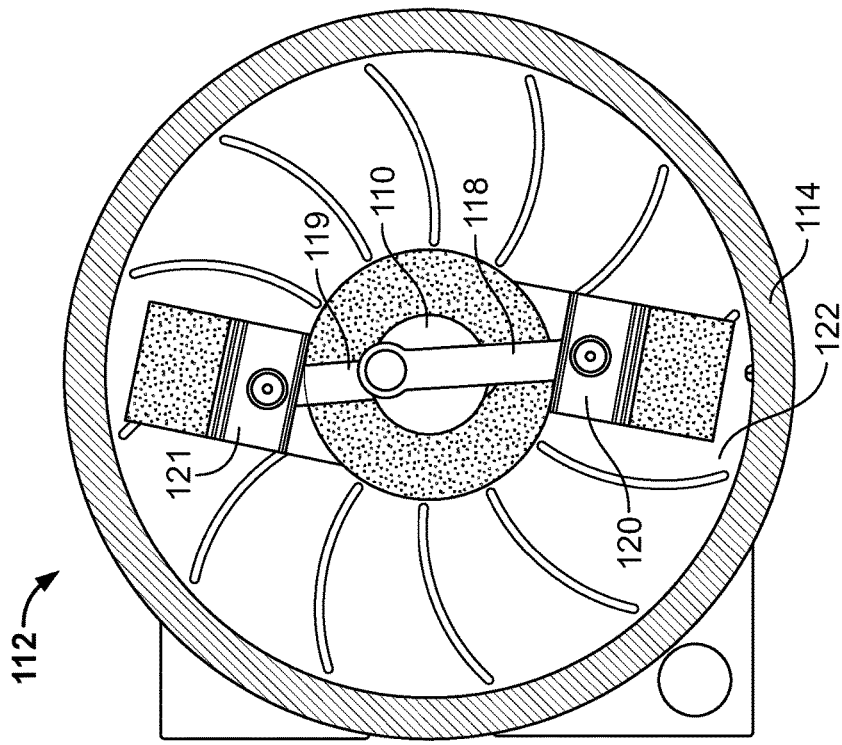
Figure 8:
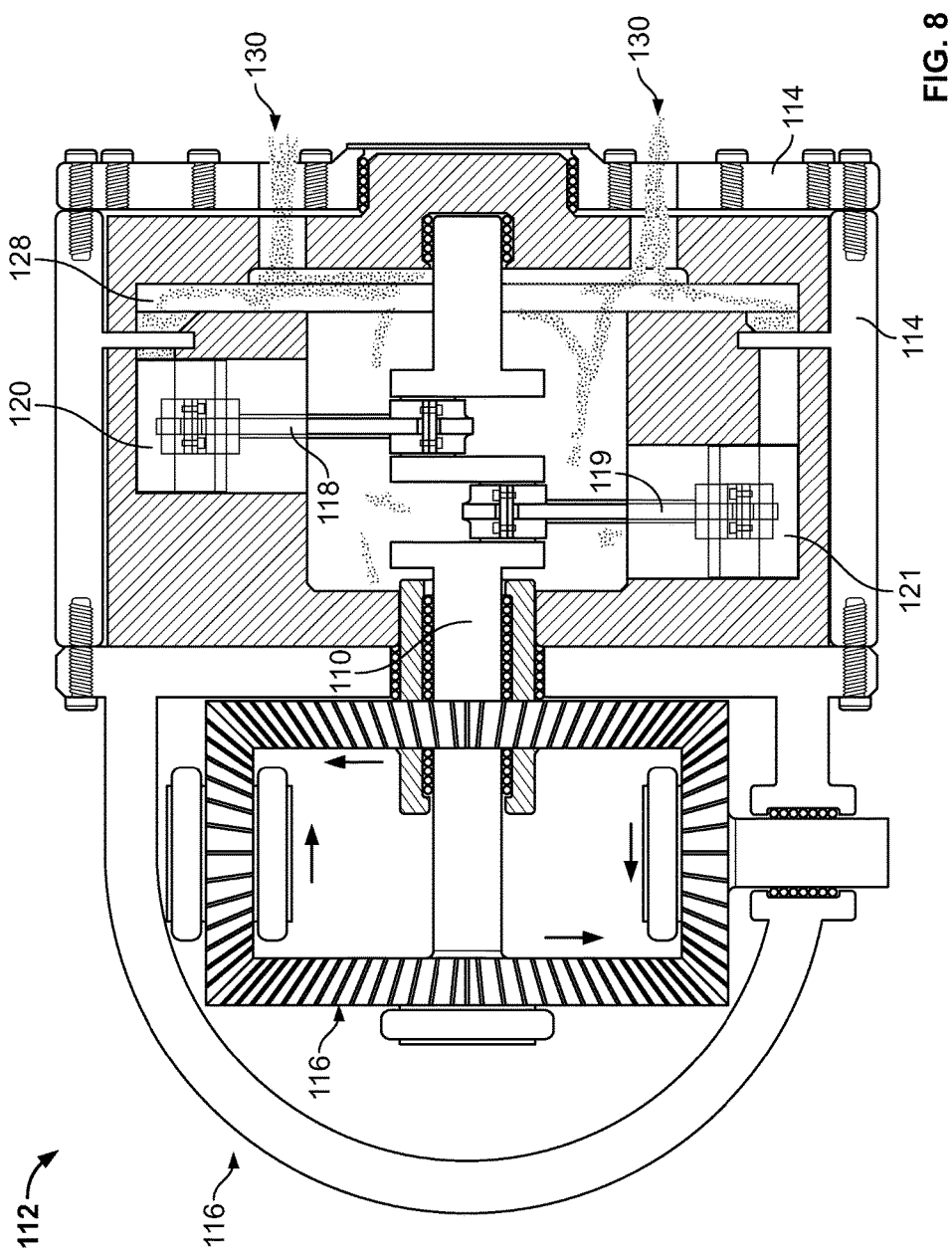
FIG. 8 is a cut away side view of an example of the engine shown in FIGS. 7A-7H in accordance with embodiments.

With continuing reference to FIGS. 7A-7H and 8, operation of an alternative embodiment is shown in which a crankshaft 110 of an engine 112 has a substantially round cross-section. The illustrated engine 112 includes an engine housing 114 with an attached gear assembly 116 (FIG. 8). The cutaway view of the engine housing 114 reveals the crankshaft 110, connecting rods 118, 119, a first piston 120, a second piston 121 and a bore structure 122.

The initial state of the illustrated first piston 120 is at maximum distance from the crankshaft 110. The pistons 120, 121 may be connected to the crankshaft 110 by a first wrist pin 124, connecting rods 118, 119 and a second wrist pin 126. Behind the engine housing 114 is the gear assembly 116 (FIG. 8), which transfers rotational energy from the crankshaft 110 to external automotive components (not shown).

Unlike conventional engine designs in which the crankshaft rotates due to a mere pushing of piston rods up and down, the illustrated engine 112 connects the rotational energy of the crankshaft 110 through the gear assembly 116 (FIG. 8) back to the bore structure 122 in a method which counter-rotates the bore structure 112. As the illustrated crankshaft 110 rotates counter-clockwise through 360 degrees, the bore structure 122 may rotate clockwise through 360 degrees. The virtual rotational angle will therefore be 720 degrees for each single revolution of the crankshaft 110, and all of the four cycles of the engine 112 can be completed in a single revolution of the crank shaft 110.

Furthermore, the illustrated bore structure 112 has optimum combustion chamber offset angles designed such that when the pistons 120, 121 are at "top dead center" (e.g., immediately upon ignition), at least twenty percent of the maximum energy will be transferred from the combustion chamber to the bore structure 122 in counter rotation to the rotation of the crankshaft 110. This technique provides substantial power beginning at ignition, wherein both the crankshaft 110 and the bore structure 122 deliver power to the gear assembly 116 (FIG. 8). The illustrated bore structure 122 therefore obviates the need for a flywheel assembly, as well as provides the ability to perform all four engine cycles within 360 degrees of crankshaft rotation. The engine 112 may therefore be able to function with as few as two cylinders as opposed to conventional engines, which may require a minimum of four cylinders.

In FIG. 7B, the first piston 120 is shown rotated clockwise forty-five degrees from the initial state in FIG. 7A. In addition, the crankshaft 110 has rotated counter-clockwise forty-five degrees due to the offset pivot point of the second pin 126. The illustrated rotation translates through the gear assembly 116 (FIG. 8) back to the bore structure 122 as a clockwise rotation of forty-five degrees from the initial state in FIG. 7A. This motion can cause the leftmost connecting rod 118 to pull the first piston 120 toward the crankshaft 110. Accordingly, a vacuum may be created in the bore structure 122 where the first piston 120 was previously positioned. The vacuum may trigger actuation of a slip valve of an injector assembly (not shown), which creates an inrush of a fuel-air mixture from the injector assembly into the void created in the combustion chamber by the vacating piston 120, where the mixture will ultimately be compressed and ignited. Simply put, the counterpoise rotation of the illustrated bore structure 122 and crankshaft 110 is equal but opposite.

In FIG. 7C, the crankshaft 110 is shown rotated counter-clockwise ninety degrees from the initial state in FIG. 7A, which translates through the gear assembly 116 (FIG. 8) back to the bore structure 122 as a clockwise rotation of ninety degrees from the initial state in FIG. 7A. This motion can cause the upward pointing connecting rod 118 to pull the first piston 120 to its maximum position toward the crankshaft 110. In FIG. 7D, the crankshaft 110 is shown rotated clockwise 135 degrees from the initial state in FIG. 7A, which translates through the gear assembly 116 (FIG. 8) back to the bore structure 122 as a clockwise rotation of 135 degrees from the initial state in FIG. 7A. This motion may cause the connecting rod 118 to push the first piston 120 outward into the bore structure 122 so that the fuel-air mixture will be compressed in the combustion chamber.

In FIG. 7E, the crankshaft 110 is shown rotated counter-clockwise 180 degrees from the initial state in FIG. 7A, which translates through the gear assembly 116 (FIG. 8) back to the bore structure 122 as a clockwise rotation of 180 degrees from the initial state in FIG. 7A. This motion can cause the connecting rod 118 to push the first piston 120 to the extreme position within the bore structure 122 and compress the fuel-air mixture to a pre-ignition level. As the counter-poise rotation of the bore structure 122 and crankshaft 110 continues, a spark plug (not shown) ignites the mixture so that the burning mixture expands and increases the pressure in the combustion chamber.

In FIG. 7F, the crankshaft 110 is forced to rotate further to 225 degrees from the initial state in FIG. 7A, which translates through the gear assembly 116 (FIG. 8) back to the bore structure 122 as a clockwise rotation of 225 degrees from the initial state in FIG. 7A. This motion can be caused by the expanding gases in the combustion chamber of the first piston 120 and may push the connecting rod 118 toward the crankshaft 110, which in turn can cause the second piston 121 to be pulled toward the crankshaft 110. This motion begins the intake cycle for the second piston 121, creating a vacuum in the combustion chamber where the second piston 121 was previously located. An inrush of a fuel-air mixture to the combustion chamber of the second piston 121 will therefore be created, where it also will eventually be compressed and ignited.

In FIG. 7G, the crankshaft 110 is shown pushed further to counter-clockwise 270 degrees from the initial state in FIG. 7A, which translates through the gear assembly 116 (FIG. 8) back to the bore structure 122 as a clockwise rotation of 270 degrees from the initial state in FIG. 7A. This motion can be caused by the continued expansion of the gases in the combustion chamber of the first piston 120 and may push the connecting rod 118 toward the crankshaft 110, again causing the piston rod 119 to pull the second piston 121 to its extreme position toward the crank shaft 110. From this point forward, the first piston 120 may begin to exhaust the burned gases through an exhaust assembly (not shown), as the second piston 121 will begin to compress the fuel-air mixture in its corresponding combustion chamber.

In FIG. 7H, the crankshaft 110 is shown rotated counter-clockwise 315 degrees from the initial state in FIG. 7A in response to the flywheel effect of the bore structure 122 just after the expansion of the gases in the combustion chamber associated with the first piston 120. This motion, again, may translate through the gear assembly 116 (FIG. 8) back to the bore structure 122 as a clockwise rotation of 315 degrees from the initial state in FIG. 7A. This rotation can cause the connecting rod 118 to push the first piston 120 outward toward the bore structure 122, further expelling the burned gases through the exhaust assembly, while the second piston 121 has begun to compress the next fuel-air mixture. Returning to FIG. 7A, the first piston 120 may begin the four cycles all over again, and the second piston 121 has compressed the fuel-air mixture and is in the pre-ignition state.

FIGS. 7A-7H and 8 therefore demonstrate that the pistons 120, 121 are not reciprocating back and forth at a high rate of speed. Indeed, they are traveling in an oval path around the crankshaft 110, wherein the arc of the path is a function of the offset of the combustion chambers from the center of the crankshaft 110. As already noted, this technique can eliminate the momentum-related piston stress on the connecting rods 118, 119 that may be problematic in conventional engines. Moreover, the elimination of a valve cam shaft and spring assembly may further improve efficiency.

FIG. 8 demonstrates that the engine 112 may also include a centrifugal blower 128 as well as an air intake injector 130. Other components not shown, such as a centrifugal oiler assembly, rod bearings, main bearings, piston rings, starter, etc., are common in engine design and may also be used to enhance operation of the engine 112.

Figure 9A:
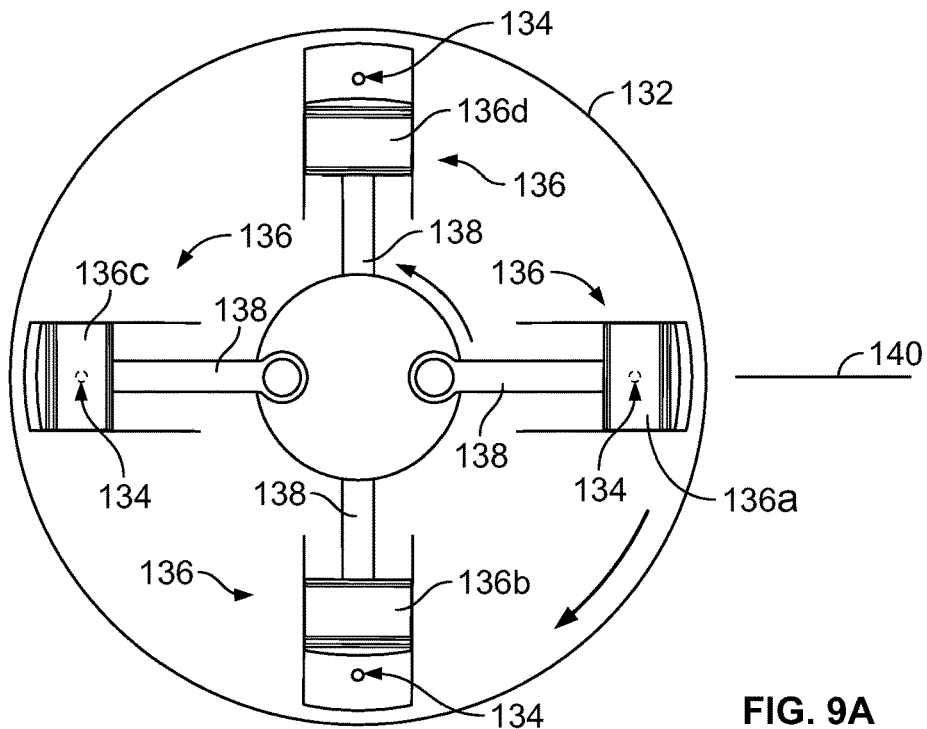
FIGS. 9A and 9B are cut away top views of an example of an engine having variable offset angles in accordance with embodiments.
Figure 9B:
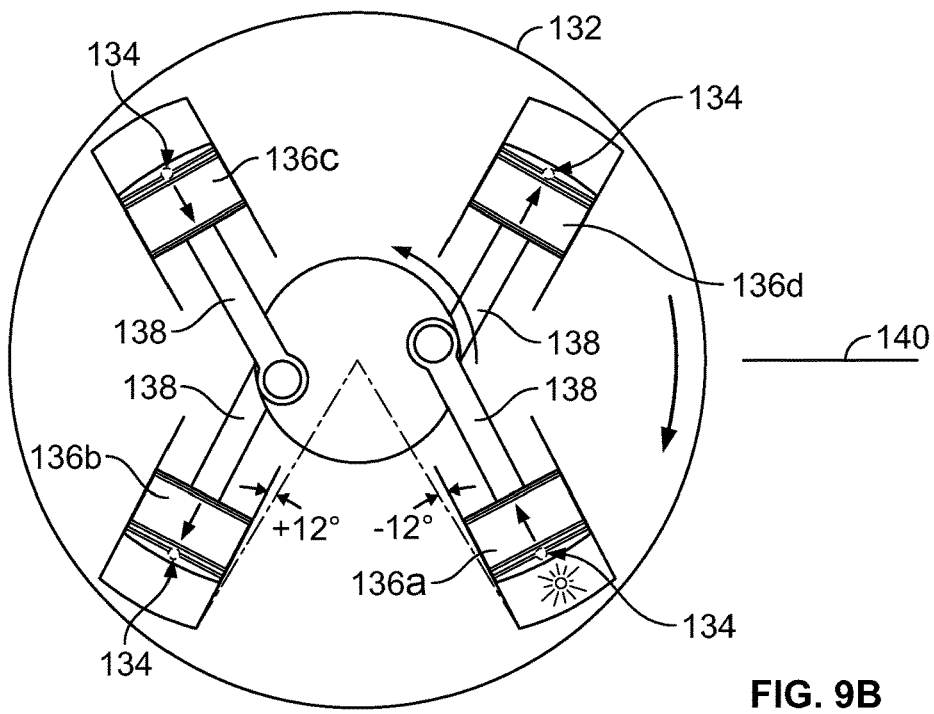

Turning now to FIGS. 9A and 9B, a bore structure 132 having variable offset angles is shown. Generally, each combustion chamber of the bore structure 132 may have an associated pivot point 134 that enables the combustion chamber to rotate to a desired offset angle with respect to the crankshaft (not shown). In addition, each combustion chamber may include a piston 136 (136a-136d) that is connected to the crankshaft via a push rod 138 that does not pivot at the piston 136. The bore structure 132 may also include a top slip valve (not shown) and a bottom slip valve (not shown) for each combustion chamber.

In particular, FIG. 9A demonstrates that when the rightmost piston 136a is at a top dead center (TDC) position 140 and about to enter the power cycle, the combustion chamber corresponding to the piston 136a has an offset angle of zero degrees with respect to the center of the longitudinal axis of the crankshaft. In addition, both slip valves associated with the combustion chamber are closed. As shown in FIG. 9B, as the bore structure 132 and piston 136a rotate clockwise (and the crankshaft rotates counter-clockwise) in response to ignition of the compresses fuel-air mixture, the combustion chamber containing the piston 136a tilts following the push rod 138, reaching a maximum offset angle (e.g., −12 degrees). The combustion chamber then returns to zero degrees with respect to the center of the longitudinal axis of the crankshaft to accommodate the expansion of the ignited gases in the combustion chamber at the optimum bore angle. Both slip valves remain closed.

Returning to FIG. 9A, the bottom piston 136b is at ninety degrees from the TDC position 140 and about to enter the exhaust cycle. The combustion chamber corresponding to the piston 136b has an offset angle of zero degrees with respect to the center of the longitudinal axis of the crankshaft, and both slip valves associated with the combustion chamber are closed. As shown in FIG. 9B, as the bore structure 132 and piston 136b rotate clockwise, the combustion chamber containing the piston 136b tilts following the push rod 138, reaching a maximum offset (e.g., +12 degrees) and the bottom slip valve opens to accommodate the expulsion of the remaining ignited gases from the combustion chamber.

FIG. 9A demonstrates that the leftmost piston 136c is at 180 degrees from the TDC position 140 when it is about to enter the intake cycle. The combustion chamber corresponding to the piston 136c has an offset angle of zero degrees with respect to the center of the longitudinal axis of the crankshaft, and both slip valves associated with the combustion chamber are closed. As shown in FIG. 9B, as the bore structure 132 and piston 136c rotate clockwise, the combustion chamber containing the piston 136c tilts following the push rod 138, reaching a maximum offset (e.g., −12 degrees) and the top slip valve opens to accommodate the entry of the fuel-air mixture to be compressed and ignited.

Returning now to FIG. 9A, the top piston 136d is at 270 degrees from the TDC position 140 and about to enter the compression cycle. The combustion chamber corresponding to the piston 136d has an offset angle of zero degrees with respect to the center of the longitudinal axis of the crankshaft, and both slip valves associated with the combustion chamber are closed. As shown in FIG. 9B, as the bore structure 132 and piston 136d rotate clockwise, the combustion chamber containing the piston 136d tilts following the push rod 138, reaching a maximum offset (e.g., +12 degrees) and both slip valves are closed to accommodate the compression of the fuel-air mixture contained in the combustion chamber. Thus, the illustrated approach enables a more sophisticated engine to be achieved, wherein the responsiveness of a low offset angle may be integrated with the torque of a high offset angle into a single engine. Additionally, the wear on the combustion chamber side walls can be reduced due to the illustrated pushrod 138 remaining straight with the piston 136. This approach may also reduce angular losses on the pushrod 138-piston 136 combination.

With further regard to the offset angle, it has been determined that an offset angle of −2 degrees from TDC can provide an engine with equivalent torque as a conventional engine with half as many cylinders. Moreover, depending on the application, the offset angle might be established (on a fixed or variable basis) as shown below in Table I.

TABLE I

| Offset Angle (absolute) | Application |
| --- | --- |
| 0-3 degrees | Small, highly responsive engines (e.g., sport vehicles) |
| 3-7 degrees | Larger, high torque engines (e.g., small trucks, luxury vehicles) |
| 7-12 degrees | Premium, special purpose engines (e.g., generators, trains, ships, power plants) |
| 12-45 degrees | High wear, highly maintained engines (e.g., tanks, militarized machinery, research engines) |
| 45-90 degrees | Future platforms |

Figure 10A:
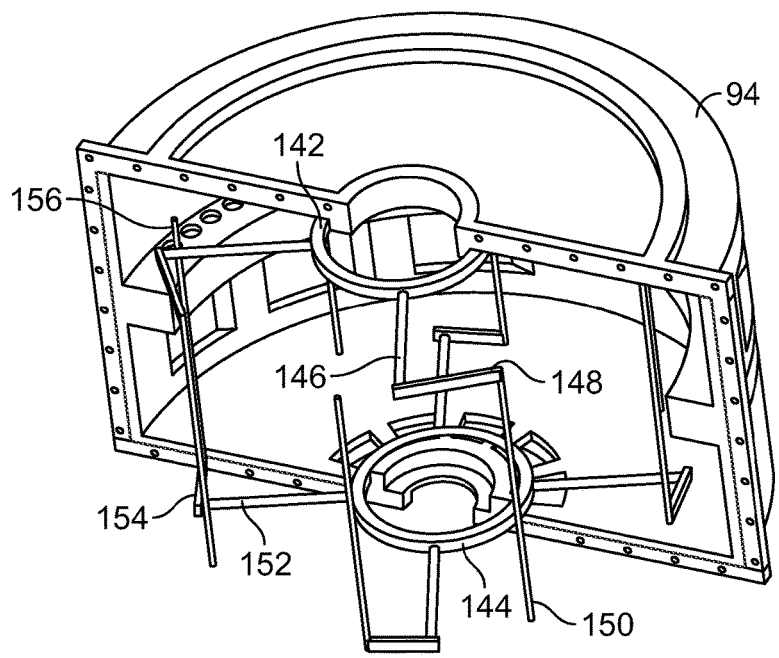
FIGS. 10A and 10B are cut away perspective views of an example of a valve assembly slip ring and push rod configuration in accordance with embodiments.
Figure 10B:
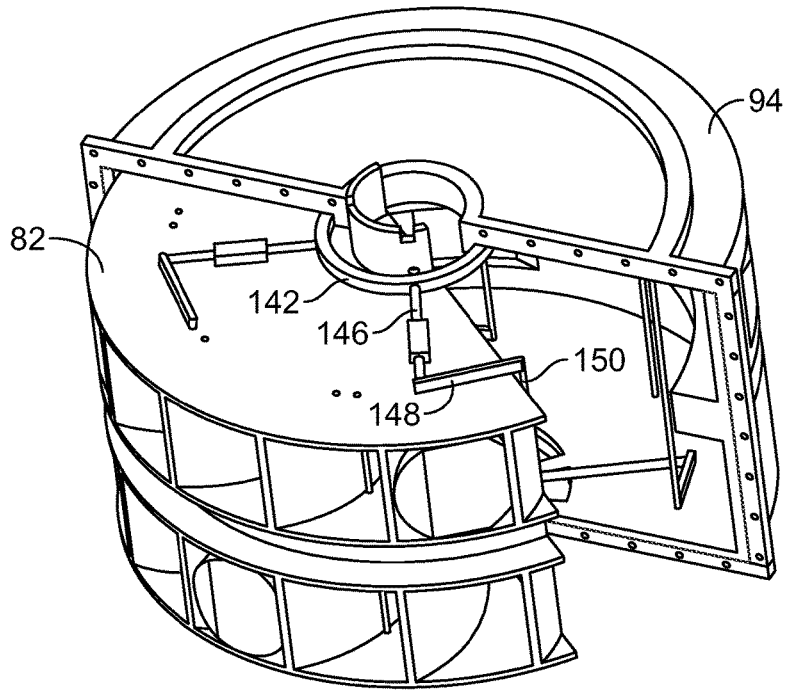

FIGS. 10A and 10B demonstrate operation of another alternative embodiment in which a slip ring and push rod configuration of a valve assembly (not shown) can be utilized to accommodate the higher pressures encountered in high compression engines such as a diesel engine. In particular, the intake/exhaust portion of a housing 94 is shown wherein a set of slip rings 142, 144 is coupled to the housing 94 at varying offset positions. For example, a bottom slip ring 144 can be coupled the housing 94 in a position that is offset from concentric to the center of the housing 94. A second slip ring 142 can also be coupled to the top of the housing 94 in a position that is offset in a different direction from concentric to center. The offset mounting arrangement is best seen with respect to the bottom slip ring 144 (FIG. 10A). The illustrated example also includes push rods coupled to the slip rings 142, 144, rocker arms coupled to respective push rods and transition rods coupled to the rocker arms.

For example, a push rod 146 is coupled to the top slip ring 142, a rocker arm 148 is coupled to the push rod 146, and a transition rod 150 is coupled to the rocker arm 148. Since the engine housing 94 is stationary while the bore structure 82 is rotating (e.g., at an effective ratio of one crankshaft rotation per fire), if the offset of the slip ring 142 is aligned to apply outward pressure on the push rod 146 at the proper time, the illustrated the rocker arm 148 will move and in turn rotate the transition rod 150. The valve associated with the correct piston may therefore be opened to allow the exhaust of the burned fuel mixture.

If the offset of the slip ring 144 is ninety degrees behind the top slip ring 142, it may be in the ideal direction to apply pressure to a push rod 152 at the proper time to move a rocker arm 154 and therefore rotate a transition rod 156. The valve associated with the corresponding piston may be opened in response to allow the intake of the next air fuel mixture in preparation for the compression cycle.

Additionally, since a counterpoise engine as described above may involve only one revolution of the crankshaft per actuation of various valves, the illustrated solution can eliminate a 2-to-1 gear set as may be required in conventional Otto type engines as well as to the corresponding camshaft that would typically move the valves into the open and closed state.

Figure 11A:
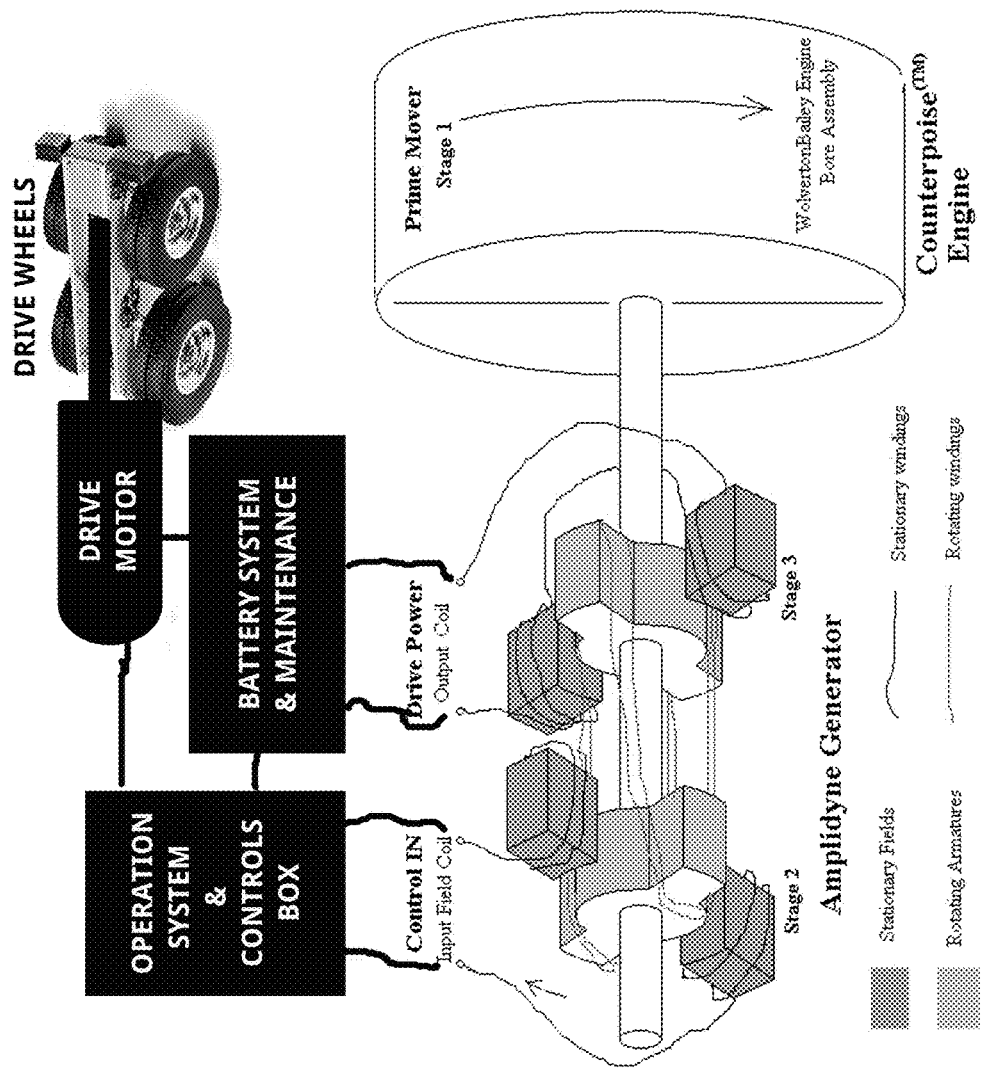
FIGS. 11A and 11B are diagramic views of a hybrid drive unit for a motor vehicle in accordance with embodiments.
Figure 11B:
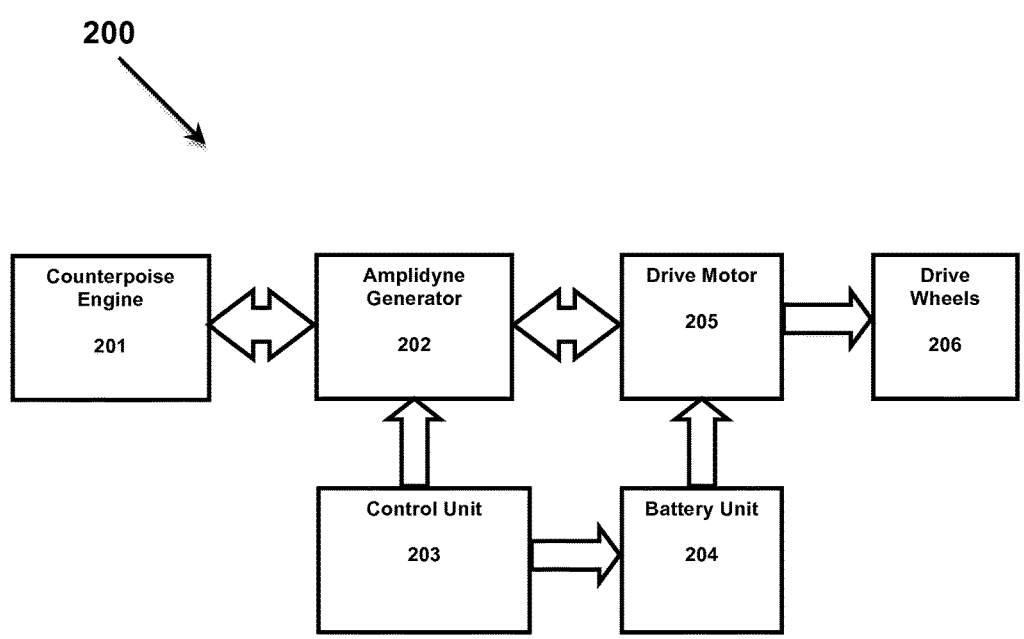

As illustrated in FIGS. 11A and 11B, the counterpoise engine described herein may also be used in a hybrid drive system 200 for a motor vehicle, and which may be activated to provide the power required for charging the storage batteries and providing supplemental drive energy (acceleration) to the motor vehicle. Such a hybrid drive system 200 may also include an internal combustion engine, such as, for example, the counterpoise engine 201, a generator 202, such as, for example, an amplidyne-type generator 202, a control unit 203, a battery unit 204 having one or more battery cells, a drive motor 205, and drive wheels 206 of the motor vehicle. Such a hybrid drive, a "hybridyne" drive system, is to employ the counterpoise engine described above and an amplidyne-type generator that will allow a small control voltage, applied to an input, to be regenerated through double stages of a "Quadrature" generator to develop an enhanced amount(s) of electrical power to the battery unit and drive motors of a hybrid vehicle.

In the hybridyne drive system, the counterpoise engine 201 is operatively and/or structurally connected to a shaft 201a. Operatively and/or structurally connected to the shaft is the amplidyne generator 202, which may include, for example, a pair of armatures 202a axially spaced apart on the shaft 201a for rotation therewith, rotating windings 202b surrounding the armatures 202a for rotation therewith, a pair of stationary field coils 202c having stationary windings 202d. The amplidyne generator 202 includes a control section that is operatively connected to a control unit 203 having control circuitry, and a drive power section that is operatively connected to a battery unit 204 and the control unit 203. Both the control unit 203 and the battery unit 204 are respectively operatively connected to a drive motor 205, which in turn, is operatively connected to the drive wheels 206 of the motor vehicle. The rotating armatures 202a are arranged at right angles to each other, which eliminates magnetic coupling between them, allowing each to have a power gain of approximately 100:1.

The control unit 203 may include one or more sensors operatively connected thereto to detect various operational parameters of the hybridyne drive system 200, such as for example, the power output by the counterpoise engine 201 or the output by the amplidyne generator 202. In turn, the control unit 203 may control the power output by the counterpoise engine 201 in response to the detected power output.

In a first control stage of the hybridyne drive system, the counterpoise engine 201 described herein, may be provided as a range extender to provide power required for charging the storage batteries of the battery unit 204 and also providing additional acceleration to the motor vehicle.

In a second control stage, a control-in section of the amplidyne generator 202 is provided to take an electrical current applied to the stationary field coils 202c, and thereby create a magnetic field between the stationary field coils 202c. The strength of the magnetic field is variable and controlled by the control unit 203. The control-in section includes one of the rotating armatures 202a that is to move through the magnetic field in the second control stage, and thereby create an output current that is directly applied to the rotating portion of a third control stage (described below), thus eliminating the need for brushes.

In a third control stage, a drive power (inside-out) section of the amplidyne generator 202 includes the other one of the rotating armatures 202a that is to receive the current output by the rotating portion of the control-in section in the second control stage. A magnetic field rotating with the rotating armature 202a is arranged a predetermined angle (such as, for example 90 degrees) away from the output field of the second control stage, and therefore, does not affect it. The counterpoise engine 201, as the prime mover, is to supply mechanical, rotational energy to the rotating armature 202a of the drive power section of the amplidyne generator 202, moving it through the stationary output coils of the drive power section, which then induces a large current in the windings of the output field coil 202c. The power gain of the drive power section is approximately 100:1 and at a constant 90 degree offset from the input field coil 202c of the control-in section of the second control stage. The resultant output field does not affect the input field.

The hybridyne drive system in accordance with embodiments is advantageous for greatly enhancing the available power in hybrid vehicles while increasing the efficiency.

Ultimately, the combined power gains of the hybridyne drive in accordance with embodiments provides an overall input-to-output power of approximately 10,000:1. A hybrid vehicle that incorporates the power control of an amplidyne generator with the efficiency of the counterpoise engine results in a minimization of its carbon footprint and a transfer of enhanced power to the drive chain.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A hybrid drive for a motor vehicle, comprising:
   drive wheels;
   a drive motor to drive the drive wheels;
   a battery unit operatively connected to the drive motor;
   a control system operatively connected to the drive motor and the battery system;
   an amplidyne generator in operative connection with the battery unit and the control system; and
   a combustion engine to drive the amplidyne generator, the combustion engine including:
      a crankshaft to rotate in a first direction;
      a plurality of pistons coupled to the crankshaft for rotation about a longitudinal axis of the crankshaft;
      a bore structure having a bore body with surfaces that define a plurality of combustion chambers that are enclosed at a top thereof by the bore body, wherein each combustion chamber contains one of the plurality of pistons and the bore structure is to rotate about the longitudinal axis of the crankshaft in response to piston displacement within the combustion chambers caused by ignition of a compressed fuel-air mixture in the combustion chambers, wherein the plurality of combustion chambers includes a pair of opposing combustion chambers having longitudinal axes that are offset from a center of a longitudinal axis of the crankshaft by an offset angle;
      a housing that is stationary and encloses the bore structure and the plurality of pistons, the housing having surfaces defining a pressurization inlet, a pressurization outlet, a cooling outlet, and an intake inlet for the bore structure;
      an air filter coupled to the pressurization inlet;
      an exhaust manifold coupled to the cooling outlet; and
      an intake plenum coupled to the pressurization outlet and the intake inlet, the intake plenum capturing pressurized air from the bore structure and maintaining the air pressure at intake ports to the plurality of pistons for use during an intake cycle of the engine,
   wherein the plurality of pistons are coupled to the crankshaft such that the bore structure and the pistons rotate about the longitudinal axis of the crankshaft in a second direction which is opposite to the first direction of rotation of the crankshaft.

2. The hybrid drive of claim 1, wherein the offset angle is between approximately 2 degrees and approximately 90 degrees.

3. The hybrid drive of claim 2, wherein the offset angle is approximately 11.25 degrees.

4. The hybrid drive of claim 2, wherein the offset angle is fixed.

5. The hybrid drive of claim 2, wherein the offset angle is variable.

6. The hybrid drive of claim 1, wherein one or more of the plurality of pistons includes a sloped piston face.

7. The hybrid drive of claim 1, wherein the amplidyne generator comprises:
a pair of armatures axially spaced apart at right angles to each other, and which are to rotate in response to the amplidyne generator being driven by the counterpoise engine;
rotating windings surrounding the armatures for rotation therewith; and
a plurality of stationary field coils having stationary windings, and which surround the rotating armatures.

8. The hybrid drive of claim 1, wherein the amplidyne generator comprises a control section that is operatively connected to the control unit, the control section including a first armature of the pair of armatures, and a pair of stationary coils that surround the first armature.

9. The hybrid drive of claim 8, wherein the amplidyne generator a drive power section that is operatively connected to the battery unit, the drive power section including a second armature of the pair of armatures, and a pair of stationary coils that surround the second armature.

10. A hybrid drive for a motor vehicle, comprising:
drive wheels;
a drive motor to drive the drive wheels;
a battery unit operatively connected to the drive motor;
a control system operatively connected to the drive motor and the battery system;
an amplidyne generator in operative connection with the battery unit and the control system; and
a combustion engine to drive the amplidyne generator, the combustion engine including a bore structure having a stationary housing, and a bore body enclosed in the stationary housing, and which has surfaces that define a pair of opposing combustion chambers that are enclosed at a top thereof by the bore body, the combustion chambers having longitudinal axes that are offset from a center of a longitudinal axis of a crankshaft to be coupled to the bore structure, and pistons coupled to the crankshaft for rotation about a longitudinal axis of the crankshaft, wherein displacement of each of the pistons disposed within a corresponding combustion chamber and caused by ignition of a compressed fuel-air mixture in the combustion chambers, the pistons being coupled to the crankshaft such that the bore structure rotates about the longitudinal axis of the crankshaft in direction opposite to a rotational direction of the crankshaft.

11. The hybrid drive of claim 10, wherein the longitudinal axes of the opposing combustion chambers are to be offset from a center of the longitudinal axis of the crankshaft by an offset angle that is between approximately 2 degrees and 90 degrees.

12. The hybrid drive of claim 11, wherein the offset angle is approximately 11.25 degrees.

13. The hybrid drive of claim 11, wherein the offset angle is fixed.

14. The hybrid drive of claim 11, wherein the offset angle is variable.

15. The hybrid drive of claim 10, wherein the amplidyne generator comprises:
a pair of armatures axially spaced apart at right angles to each other, and which are to rotate in response to the amplidyne generator being driven by the counterpoise engine;
rotating windings surrounding the armatures for rotation therewith; and
a plurality of stationary field coils having stationary windings, and which surround the rotating armatures.

16. The hybrid drive of claim 10, wherein the amplidyne generator comprises a control section that is operatively connected to the control unit, the control section including a first armature of the pair of armatures, and a pair of stationary coils that surround the first armature.

17. The hybrid drive of claim 16, wherein the amplidyne generator a drive power section that is operatively connected to the battery unit, the drive power section including a second armature of the pair of armatures, and a pair of stationary coils that surround the second armature.

18. A method of operating a motor vehicle, the method comprising:
providing a hybrid drive having drive wheels, a drive motor to drive the drive wheels, a battery unit operatively connected to the drive motor, a control system operatively connected to the drive motor and the battery system, an amplidyne generator in operative connection with the battery unit and the control system, and a combustion engine to drive the amplidyne generator, the combustion engine including a bore structure having a stationary housing, and a bore body enclosed in the stationary housing and which has surfaces that define a pair of opposing combustion chambers that are enclosed at a top thereof by the bore body, the combustion chambers having longitudinal axes that are offset from a center of a longitudinal axis of a crankshaft to be coupled to the bore structure, and a plurality of pistons coupled to the crankshaft for rotation about a longitudinal axis of the crankshaft, wherein displacement of the pistons disposed within a corresponding combustion chamber and caused by ignition of a compressed fuel-air mixture in the combustion chambers, the pistons being coupled to the crankshaft such that the bore structure rotates about the longitudinal axis of the crankshaft in direction opposite to a rotational direction of the crankshaft;
activating the combustion engine to create a magnetic field in the the amplidyne generator, by initiating a displacement of the pistons in the combustion chambers, rotating the bore structure relative to the stationary housing, rotating the pair of pistons in an oval path in response to rotation of the bore structure, and capturing pressurized air from the bore structure and maintaining the air pressure at intake ports to the pistons for use during an intake cycle of the engine;
wherein the plurality of combustion chambers includes a pair of opposing combustion chambers that are enclosed at a top thereof by the bore structure, the combustion chambers having longitudinal axes that are offset from a center of a longitudinal axis of the crankshaft by an offset angle.

19. The method of claim 18, wherein initiating the displacement of the pair of opposing pistons is associated with at least one of a combined power-intake cycle and a combined exhaust-compression cycle.

* * * * *